United States Patent [19]

Doll

[11] Patent Number: 4,972,616
[45] Date of Patent: Nov. 27, 1990

[54] PLANT CODING SYSTEM
[75] Inventor: James Doll, Grand Ledge, Mich.
[73] Assignee: The John Henry Company, Lansing, Mich.
[21] Appl. No.: 746,133
[22] Filed: Jun. 18, 1985
[51] Int. Cl.⁵ ............................................. G09F 23/00
[52] U.S. Cl. ........................................ 40/645; 40/299
[58] Field of Search ..................... 40/10 C, 2 R, 10 R, 40/645, 642, 299, 584, 606, 607

[56] References Cited

U.S. PATENT DOCUMENTS 2,192,514  3/1940  Carleton ............................. 40/10 C
2,554,105  5/1951  Heinle ................................ 40/10 C
3,775,882 12/1973  Wheeler ............................. 40/10 C

*Primary Examiner*—Kenneth J. Dorner
*Assistant Examiner*—J. Hakomaki
*Attorney, Agent, or Firm*—Price, Heneveld, Cooper, DeWitt & Litton

[57] ABSTRACT

A plant coding system used by retail establishments includes a plant wall chart color coded according to groups of plants requiring certain amounts of sunlight, cards similarly color coded and located at the display area for plants of a similar variety requiring a predetermined level of light; and plant tags associated with each plant and color coded to correspond to the light required and shown also on the card.

27 Claims, 1 Drawing Sheet

PLANT CODING SYSTEM

BACKGROUND OF THE INVENTION

The present invention pertains to a plant identification system including different sized plant guides employing a unique code identifying one or more characteristics of a plant.

In purchasing live plants for planting around the home or positioning within the home, one major consideration is the amount of sunlight available in the planting area. Depending upon the light conditions, some plants may or may not survive the desired planting or display location. Thus, for example, daisies require a significant amount of sunlight, while lillies of the valley can survive in part-shade-to-shade lighting conditions. Thus, when selecting a plant for a particular location, it is desirable for the purchaser to know the sunlight requirements of such a plant. Alternately, when a particular plant is desired, and the location has not been selected, it is necessary to be aware of its sunlight requirements in order to select a location which is suitable.

There has been a variety of methods of identifying care requirements for plants, typically through plant care books, or the like. Tags attached to the plant may also carry plant care information thereon. Color coding has also been used to indicate the amount of sunlight required for a plant. Wall charts have also been employed to provide the identification of a variety of plants, as well as their light and moisture requirements.

SUMMARY OF THE INVENTION

When selling a variety of plants with a variety of plant care characteristics, it is desirable to quickly and easily educate the purchaser as to the plant care requirements and, particularly, the amount of sunlight necessary for successful plant care. In order to accomplish this, an integrated system of the present invention incorporates three distinct plant identification structures. A wall chart is provided having a guide disclosing a code made of a plurality of patterns of one or more distinct code elements corresponding to variations of a predetermined care parameter or other characteristic of the plants. The chart includes indicia adjacent each code element for identifying each parameter variation associated with the particular code element as well as patterns made of two or more elements.

The wall chart is placed on the wall of a retail establishment in a common area adjacent the area of sales of live plants. In addition to the wall chart, near select species of related plants having the same care requirements, plant identification cards are provided which are relatively visible from a distance and which include at least one code element defining the code pattern corresponding to the predetermined parameter of the plant care characteristic of that group of plants. Additionally, the plant code system of the present invention includes individual plant tags which are attached to individual plants or inserted in the plant pot or bedding material. Each individual plant tag includes this same code pattern identifying the parameter variation associated with that plant.

In the preferred embodiment of the invention, a code is comprised of geometric shapes colored to represent light conditions, although the code elements may represent parameters of plant care other than light, including, for example, moisture requirements, plant characteristics such as size, or the like. By providing a three level system of plant guide coding, a purchaser is readily educated to the code system itself and its application to plants offered for sale such that a plant can be easily selected for any given condition desired.

These and other features, objects and advantages of the present invention will become apparent upon reading the following description, together with reference to the accompanying drawings in which:

DETAILED DESCRIPTION OF THE PREFERRED EMBODIMENT

Figure 1:
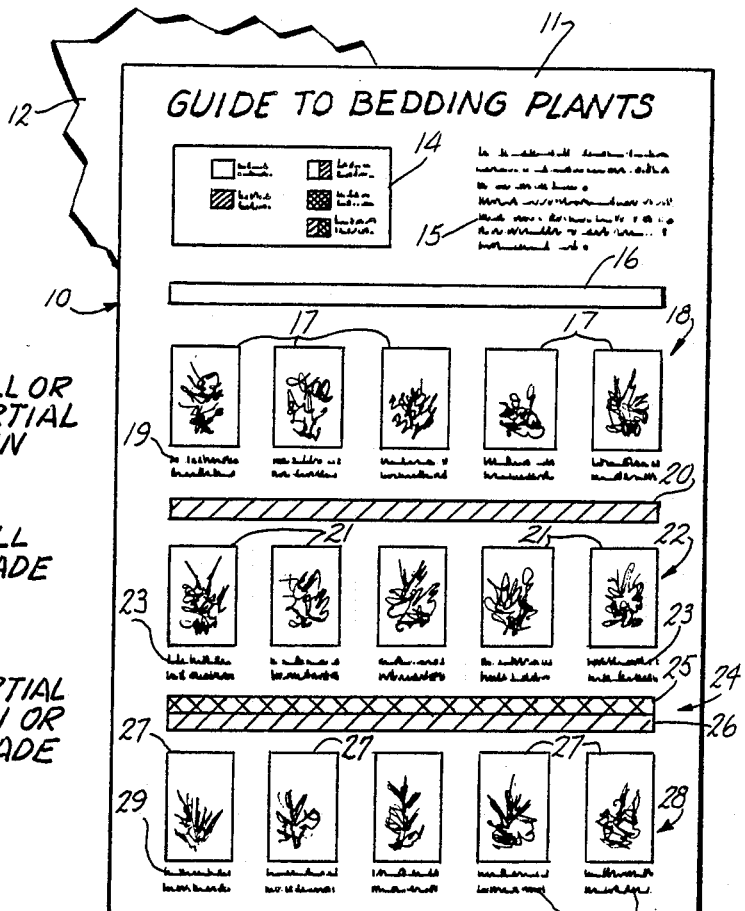
FIG. 1 is a fragmentary front elevational view of a wall chart incorporated in the present invention.
Figure 3:
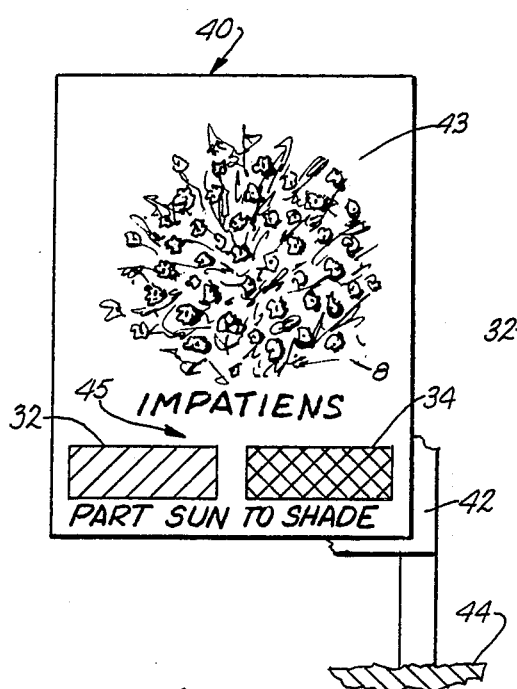
FIG. 3 is a fragmentary front elevational view of a plant identification card incorporated in the present invention.
Figures 4, 5:
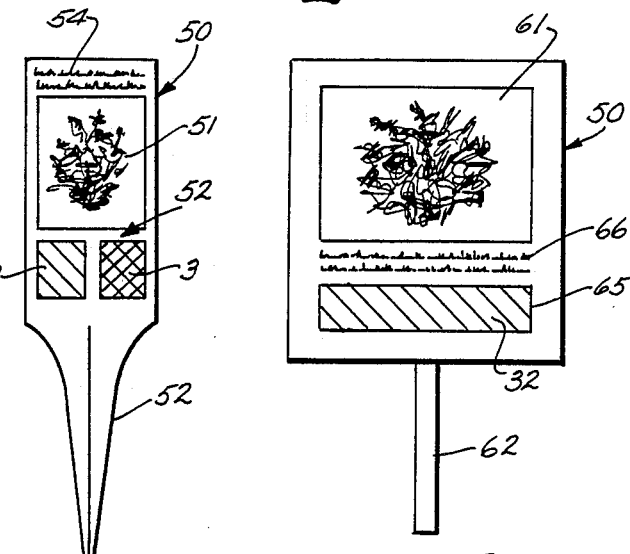
FIG. 4 is a one embodiment of a plant tag which can be employed in the present invention; and, FIG. 5 is another embodiment of a plant tag which can be employed in the present invention.

The system of the present invention includes a relatively large guide, such as a wall chart 10, shown in FIG. 1, together with typically several plant identification cards 40 one of which is shown in FIG. 3, and a plurality of plant tags which can be of the type shown by tag 50 in FIG. 4 or 60 in FIG. 5. Thus, the system of the present invention embodies a comprehensive, sequential series of plant characteristic identification guides which a consumer uses to assist in the plant selection process. Typically, the wall chart 10 will be located in a central area readily visible near, for example, the entrance to a plant display area. Each of the plant cards illustrated in FIG. 3 typically will be located near a collection of plants having common characteristics identified by the coding on the card. The plant tags shown in FIGS. 4 and 5 will be associated with individual plants.

Referring initially to FIG. 1, the wall chart 10 is typically of poster size, having a dimension of, for example, two feet by three feet and made of a suitable poster material. Poster 10 is mounted to a wall 12 of a retail facility as illustrated schematically in FIG. 1 and includes an appropriate title 11 identifying categories of plants, such as perrenials, annuals, bedding plants or the like. Poster 10 includes a code guide 14, together with a written description 15 on how the guide and plant characteristic code system is used. The poster further includes a series of rows and columns typically of plant photographs and associated code patterns corresponding to a common care or other characteristic of the row or rows of plants illustrated. In the preferred embodiment described, the plant characteristic identified by the code system, pertains to the amount of sunlight necessary for healthy plant life.

In FIG. 1 for example, poster 10 includes a first rectangular code element 16 uniquely identifying the plant care characteristic that the plant requires full sunlight. Element 16 extends above and across a row 18 of photographs 17 of individual plants which require full sunlight. Below each photograph 17 of the plants is a description 19 of the plant, including, for example, size, planting and watering requirements. The poster 10 further includes a second code element 20 identifying partial sun plants illustrated in row 22 by individual photos 21 showing such plants. Below photos 21 is a written description 23 of the plants so identified. Poster 10 further includes a code pattern 24 comprising a first code band 25 and a second code band 26 which, as described in connection with FIG. 2 below, identifies plants which require partial sun or shade, those plants being shown by row 28 of photographs 27 of individual plants including a written description 29 of the plants.

Typically, poster 10 will include several rows of plants under each plant characteristic identification code and they include several additional rows of plant tags utilizing all combinations of the three basic code elements of the preferred embodiment of the invention. Thus, for example, poster 10 may include four rows 18 of photographs of plants requiring full sun, two or more rows of photographs 22 of plants requiring partial sun, one or more rows of plants requiring only full shade, etc. The sizes of the photographs 17, 21 and 27, shown in wall poster 10, are typically uniform and can vary from relatively small photographs such as two inches on a side and square to four inches on a side and square, or rectangular of different dimensions, circular or any other desired shape for representation of the plants being shown. Thus, the poster illustrated in FIG. 1 is only representative of the layout of a typical wall chart including the code guide and application to large numbers of plants of certain categories which may be of interest to a purchaser. An enlargement of the code guide 14, shown in FIG. 1 is shown in FIG. 2, in which the five combinations of the three basic code elements is shown and is now described.

Figure 2:
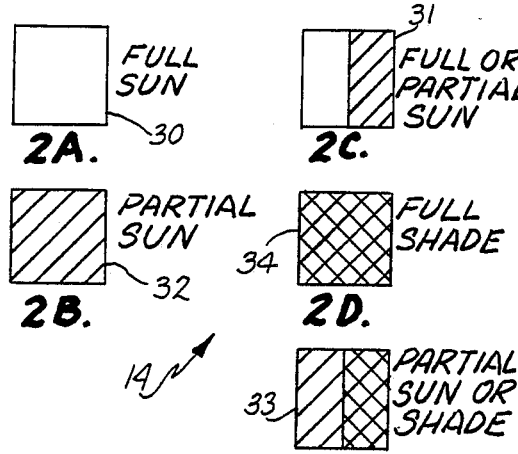
FIG. 2 is an enlarged front elevational view of the code guide shown in FIG. 1, including FIGS. 2A-2E showing the unique code elements and patterns thereof.

The code guide 14 includes three distinct code elements 30, 32 and 34 shown in FIGS. 2A, 2B and 2D. These code elements identify full sun conditions, partial sun conditions and full shade conditions, respectively, as shown in the written identification adjacent each code element. The intermediate light conditions between full sun and partial sun is represented as shown in FIG. 2C by a code pattern 31 including two geometric shapes with one shape having the characteristics shown by code element 30 and the remaining shape having the characteristic shown by code element 32. Similarly, plants requiring light conditions falling between partial sun and full shade is shown by code pattern 33 which includes a geometric shape corresponding to code element 32 and an adjacent geometric shape corresponding to code element 34 thus utilizing the three basic code elements 30, 32 and 34, either individually or in selected combinations, to identify five zones of light conditions. In the preferred embodiment, each of the code elements shown in FIG. 2 are geometric shapes and particularly quadrilateral shapes, although circles, triangles and the like could likewise be employed. The individual code elements have color as their unique characteristic. Thus, code element 30 is yellow, code element 32 is orange, while code element 34 is violet. The size of the code elements can, of course, vary depending upon the article to which they are applied. In the poster, for example, the code elements are broad bands and on the plant card 40 the code elements are relatively large to be readily visible from a substantial distance of 25 feet or more. In one embodiment, the code elements on a wall poster were rectangular, having a height of 1.3 inches and a width slightly less than that of the poster. Similarly, the code elements applied to a typical wall card 40 were rectangular, having a height of 1.2 inches and a width of 3.7 inches. Although the code elements of the preferred embodiment used three colors varying from bright to a deeper color representing full sun to shade conditions, other colors could be employed or other readily visible unique code identifying characteristics could be employed.

The application of the code elements shown in the code guide 14, in addition to the wall poster 10 is shown in FIGS. 3-5. FIG. 3 illustrates a plant card which typically is an 8 inch by 10 inch card made of polystyrene or other suitable weather resistant material mounted to a framing structure 42 shown schematically in FIG. 3 such that it can be supported in the ground 44 or on the floor of a building depending upon whether the card is located in an indoor display area or an outdoor display area. The card has a size sufficient that it can be spotted from a significant distance and includes a photographic representation 43 of plants, flowers or the like being sold under the common characteristic identified by the code elements 32 and 34 in the particular card shown. Thus, each card will include a code pattern 45 which may include one or more code elements such as code 32 and 34 indicating part-sun-to-shade for the impatience illustrated on the plant card 40 of FIG. 3. The card may likewise include indicia printed over the color code elements 32 and 34 providing further information for the plants.

Card 40 will be used, for example, in association with a display of a group of plants such as impatiens which may include six or more different varieties which are separately packaged for sale. Each of the separate varieties will in turn include a plant tag such as that shown by tag 50 in FIG. 4 which is a polystyrene tag having a projecting end 52 which is inserted into the soil for the plant. Tag 50 also includes a code pattern 52 which, for the impatiens shown in the graphic illustration 51 on the tag 50, includes code elements 32 and 34 corresponding to that of the associated card 40 located in the area of the varieties of impatiens. The plants are also identified on tag 50 by plant identification written indicia 54.

For larger varieties of plants, such as shrubs, trees and the like, a tie-on type plant tag 60 can be employed and is shown in FIG. 5. Tag 60, likewise, includes a body of polystyrene or the like, including printed indicia 61 which can be a photograph or other graphic representation identifying the plant. Tag 60 likewise includes a code pattern 65 comprising one or more code elements such as element 32 illustrated and printed indicia 66 indicating other plant information such as moisture requirements, planting information or the like. Plant tag 60 includes a welded on tie 62 which can be wrapped around a branch of the plant for application to the plant. Tag 60 is of the type described in U.S. Pat. No. 4,407,082. Tags different than those shown in FIGS. 4 and 5 for use in association with individual plants, of course, can be employed with the tags shown in FIG. 4 and 5 being only representative. The tags, however, include the same code pattern as that of the common plant characteristic identified by the associated card 40 as shown in FIG. 3.

Thus, with the system of the present invention, a three level plant characteristic identification code system is provided to educate and assist the purchaser from the point of entry into the area in which the plants are displayed to the location of the group of plants having common characteristics and finally to the individual plants. By providing relatively large code patterns which can be identified from a significant distance, the consumer is assisted in quickly and accurately making a selection of plants. A plant care book is typically also available from the retailer and includes the same information provided on the wall chart, but in more detail and for all types of plants. The book includes the same code pattern for identifying the different characteristics and/or variations of such characteristics. In any given installation, one or more wall charts may be used to identify all of the plants sold during the particular season. Naturally, when the seasons change, the wall charts may also be changed to provide information as to plants currently being sold.

It will become apparent to those skilled in the art that various modifications to the preferred embodiment of the invention described can be made without departing from the spirit or scope thereof as defined by the appended claims.

The embodiments of the invention in which an exclusive property or privilege is claimed, are defined as follows:

1. A plant care coding system for point of purchase use comprising the combination of:
   a wall chart for positioning at a central location of a plant sales facility and including a guide disclosing a code made of a plurality of patterns of one or more distinct code elements corresponding to variations of a predetermined care parameter for plants, said chart further including means adjacent each code pattern for identifying each parameter variation associated with the adjacent code pattern;
   at least one plant identification card for positioning in an area in the facility in which a particular group of plants requiring the same predetermined parameter of care are located, said card including at least one code element defining a pattern corresponding to said same predetermined parameter; and
   a plurality of plant tage for attachment to individual plants within said groups of plants, said tags including plant identification information thereon and said at least one code element defining a pattern which is the same as the pattern on said card, whereby a purchaser can readily locate and identify plants having desired care parameters.

2. The apparatus as defined in claim 1, wherein said wall chart includes indicia identifying a plurality of plants and wherein each plant identifying indicia is associated with a pattern made of one or more of said code elements corresponding to a predetermined plant care parameter for the plant identified by said indicia.

3. The apparatus as defined in claim 2, wherein said code elements on each of said chart and card are sufficiently large to be identified by a purchaser from a distance of several feet.

4. The apparatus as defined in claim 1, wherein each of said code elements comprises a geometric shape of predetermined color which color is unique for each of said elements.

5. The apparatus as defined in claim 4, wherein said colors for said code elements include at least three different colors.

6. The apparatus as defined in claim 5, wherein said geometric shape is a quadrilateral.

7. The apparatus as defined in claim 6, wherein the parameter variation identified is the light required by a plant and said at least three colors represent full sun, partial sun or shade, respectively.

8. The apparatus as defined in claim 7, wherein said code patterns may include a combination of quadrilateral shapes of different color.

9. The apparatus as defined in claim 8, wherein the color representing full sun is brighter than the color representing partial sun and the color representing partial sun is brighter than the color representing shade.

10. The apparatus as defined in claim 9, wherein said code elements on each of said chart and card are sufficiently large to be identified by a purchaser from a distance of several feet.

11. A plant coding system for identifying a characteristic of a plant comprising the combination of:
    a wall chart of positioning at a central location of a plant sales facility and including a guide disclosing a code made of a plurality of patterns of one or more unique code elements corresponding to variations of a predetermined characteristic for plants, said chart further including indicia adjacent each code element and pattern for identifying each characteristic associated with the adjacent code element or pattern;
    at least one plant identification card for positioning in an area in the facility in which a particular group of plants having the same characteristic are located, said card including at least one code element defining a pattern corresponding to said same characteristic; and
    a plant tag for attachment to each individual plant within said group of plants, said tag including plant identification information thereon and said at least one code element defining a pattern which is the same as the pattern on said card, said chart, card and tag being employed in cooperation with each other such that a purchaser can readily locate and identify plants having desired characteristics.

12. The apparatus as defined in claim 11, wherein each of said code elements comprises a geometric shape of predetermined color which color is unique for each of said elements.

13. The apparatus as defined in claim 12, wherein said colors for said code elements include at least three different colors.

14. The apparatus as defined in claim 13, wherein said geometric shape is a quadrilateral.

15. The apparatus as defined in claim 6, wherein the characteristic identified is the light required by a plant and said at least three colors represent full sun, partial sun or shade, respectively.

16. The apparatus as defined in claim 15, wherein said code patterns may include a combination of quadrilateral shapes of different color.

17. The apparatus as defined in claim 11, wherein said code elements on said card have an area of about three square inches such that the code can be read from a substantial distance.

18. A method of directing customers to nursery stock having particular plant care characteristics comprising the steps of:
    providing a wall chart and positioning said chart at a central location of a facility, said chart including a guide disclosing a code made of a plurality of patterns of one or more distinct code elements corresponding to variations of a predetermined care parameter for plants, said chart further including means adjacent each code pattern for identifying each parameter variation associated with the adjacent code pattern;

providing at least one plant identification card and positioning said card in an area where a particular group of plants requiring the same predetermined parameter of care are located, said card including at least one code element defining a pattern corresponding to said same predetermined parameter; and providing a plurality of plant tage and positioning said tage on individual plants within said group of plants, said tags including plant identification information thereon and said at least one code element defining a pattern which is the same as the pattern on said card, whereby a purchaser can readily locate and identify plants having desired care parameters.

19. The method as defined in claim 18, wherein said first named providing step comprises providing a wall chart which includes indicia identify ting a plurality of plants and wherein each plant identifying indicia is associated with a pattern made of one or more of said code elements corresponding to a predetermined plant care parameter for the plant identified by said indicia.

20. The method as defined in claim 19, wherein said first and second named providing steps include providing code elements on each of said chart and card which are sufficiently large to be identified by a purchaser from a distance of several feet.

21. The method as defined in claim 18, wherein each of said providing steps comprises providing each of said code elements in a geometric shape of predetermined color which color is unique for each of said elements.

22. The method as defined in claim 21,. wherein said providing steps comprise providing colors for said code elements including at least three different colors.

23. The method as defined in claim 22, wherein said geometric shape provided is quadrilateral.

24. The method as defined in claim 23, wherein the parameter variation identified is the light required by a plant and said at least three colors represent full sun, partial sun or shade, respectively.

25. The method as defined in claim 24, wherein said code patterns provided may include a combination of quadrilateral shapes of different color.

26. The method as defined in claim 25, wherein the color representing full sun is brighter than the color representing partial sun and the color representing partial sun is brighter than the color representing shade.

27. The method as defined in claim 26, wherein said code elements provided on each of said chart and card are sufficiently large to bear identified by a purchaser from a distance of several feet.

* * * * *

UNITED STATES PATENT AND TRADEMARK OFFICE
CERTIFICATE OF CORRECTION

PATENT NO. : 4,972,616

DATED : November 27, 1990

INVENTOR(S) : James Doll

It is certified that error appears in the above-identified patent and that said Letters Patent is hereby corrected as shown below:

Column 4, Line 24:
  "impatience" should be --impatiens--;

Column 5, Claim 1, Line 38:
  "tage" should be --tags--;

Column 6, Claim 11, Line 14:
  "of" (first occurrence) should be --for--;

Column 7, Claim 18, Line 9:
  "tage" should be --tags--;

Column 7, Claim 18, Line 10:
  "tage" should be --tags--;

Column 7, Claim 19, Line 19:
  "identify ting" should be --identifying--;

Column 8, Claim 27, Line 25:
  "bear" should be --be--.

Signed and Sealed this

Sixteenth Day of February, 1993

*Attest:*

STEPHEN G. KUNIN

*Attesting Officer*          Acting Commissioner of Patents and Trademarks